United States Patent
Guillaume et al.

(10) Patent No.: US 12,489,314 B2
(45) Date of Patent: Dec. 2, 2025

(54) ELECTRICITY GENERATION SYSTEM COMPRISING A WATER TURBINE WITH IMPROVED DYNAMIC RESPONSE

(71) Applicant: SUPERGRID INSTITUTE, Villeurbanne (FR)

(72) Inventors: Renaud Guillaume, Lyons (FR); Hugo Mesnage, Lyons (FR)

(73) Assignee: SUPERGRID INSTITUTE, Villeurbanne (FR)

( * ) Notice: Subject to any disclaimer, the term of this patent is extended or adjusted under 35 U.S.C. 154(b) by 594 days.

(21) Appl. No.: 18/003,953

(22) PCT Filed: Jun. 30, 2021

(86) PCT No.: PCT/EP2021/067969
§ 371 (c)(1),
(2) Date: Dec. 30, 2022

(87) PCT Pub. No.: WO2022/003010
PCT Pub. Date: Jan. 6, 2022

(65) Prior Publication Data
US 2023/0268768 A1      Aug. 24, 2023

(30) Foreign Application Priority Data

Jun. 30, 2020   (FR) ...................... 2006855

(51) Int. Cl.
*H02J 15/00*      (2006.01)
*F03B 15/00*      (2006.01)

(52) U.S. Cl.
CPC ............ *H02J 15/003* (2013.01); *F03B 15/00* (2013.01); *H02J 15/007* (2020.01); *F05B 2260/421* (2013.01); *H02J 2300/20* (2020.01)

(58) Field of Classification Search
CPC .... H02J 15/003; H02J 15/007; H02J 2300/20; F03B 15/00; F05B 2260/421
See application file for complete search history.

(56) References Cited

FOREIGN PATENT DOCUMENTS

| DE | 102011119384 B3 | 3/2013 |
|---|---|---|
| EP | 2725444 A1 | 4/2014 |

(Continued)

OTHER PUBLICATIONS

International Search Report and Written Opinion issued on Sep. 16, 2021, in corresponding International Application No. PCT/EP2021/067969, 18 pages.

*Primary Examiner* — Viet P Nguyen
(74) *Attorney, Agent, or Firm* — Maier & Maier, PLLC (57) ABSTRACT

An energy production system including a hydraulic turbine system having undesirable electrical power output setpoints and identified safe electrical power output setpoints, an energy storage system, a connection connected to the energy storage system and to an electric machine of the hydraulic turbine system, and further connected to an AC power network, a device for determining the state of charge, a control circuit controlling a transfer of electrical power between the connection and the energy storage system, configured to receive an electrical power setpoint value (Reps) and configured to determine that this received electrical power setpoint value belongs to the undesirable electrical power output setpoint values to generate an electrical power transfer setpoint value (Epts), and an actual electrical power output setpoint value (Aepos) belonging to the safe electrical power output setpoint values, satisfying the relationship Reps=Epts+Aepos.

11 Claims, 8 Drawing Sheets

(56) References Cited

FOREIGN PATENT DOCUMENTS

| EP | 3579369 | A1 | | 12/2019 | |
|----|---------|----|----|---------|--|
| EP | 4108907 | A1 | * | 12/2022 | ............ F03B 15/005 |
| WO | 2019158600 | A1 | | 8/2019 | |

* cited by examiner

ELECTRICITY GENERATION SYSTEM COMPRISING A WATER TURBINE WITH IMPROVED DYNAMIC RESPONSE

FIELD

The invention relates to a power generation system using a water turbine system producing electrical power for an AC grid. In particular, the invention relates to extending the operating range of the power generation system, while mitigating unintended phenomena during operation of the water turbine system.

BACKGROUND

Many hydroelectric dams include a water turbine system for generating electrical power that is transferred to an AC grid via a feeder link. Such a system may include an energy storage system connected to the connection link to increase the responsiveness of the turbine system to a new electrical power setpoint provided by a grid operator. Such an energy storage system is particularly useful when the new setpoint involves large power variations. A control circuit receives an electrical power setpoint sent by the grid manager and, based on this setpoint, controls a transient power transfer between the feeder link and the energy storage system by selectively controlling the charging or discharging of the energy storage system. The turbine system is configured to operate over a specific output power range. Outside this output power range, several undesirable phenomena can be expected. For example, with a Francis turbine, an instability of the system called "S-shape" appears for an output power between 0% and 20% of the nominal output power, an unstable vortex appears between the turbine blades for an output power between 20% and 40% of the nominal output power, a helical cable may appear downstream of the turbine for an output power between 40% and 60% of the nominal output power and an axial cable downstream of the turbine may appear for an output power between 90% and 110% of the nominal output power. These undesirable phenomena are known to damage parts of the turbine system and prolonged use of the system under these conditions forces operators to repair the damaged parts, resulting in increased system downtime for maintenance and, consequently, increased maintenance costs.

It is therefore necessary to extend the output power range while avoiding the various undesirable phenomena mentioned above.

EP3579369 describes a method of using hydroelectric power as a power reserve for a power grid. Several hydroelectric power generators are used, each at a respective output power level, to provide electrical power for a total electrical output to said power grid. An alternating frequency of this grid is monitored to detect deviations from a base frequency range. When a deviation from this frequency range is detected, electrical power is transferred between an electrical power storage device and said power grid.

Document DE102011119384 describes a hydroelectric plant with a turbine mechanically coupled to a generator. At least one inertial energy storage device is coupled to a generator. The inertial energy storage device comprises an electrical machine, the generator and the electrical machine being coupled.

SUMMARY

The invention aims to overcome one or more of these drawbacks. The invention thus relates to a power generation system, as defined in attached claim 1.

The invention also concerns variants of the dependent claims. A person skilled in the art will understand that each of the characteristics of the description or of the dependent claims may be combined independently with the characteristics of an independent claim, without this constituting an intermediate generalisation.

BRIEF DESCRIPTION OF THE DRAWINGS

Further characteristics and advantages of the invention will become clearer from the following description, which is indicative and not restrictive, with reference to the attached drawings, in which.

DETAILED DESCRIPTION OF THE EMBODIMENTS

Figure 1:
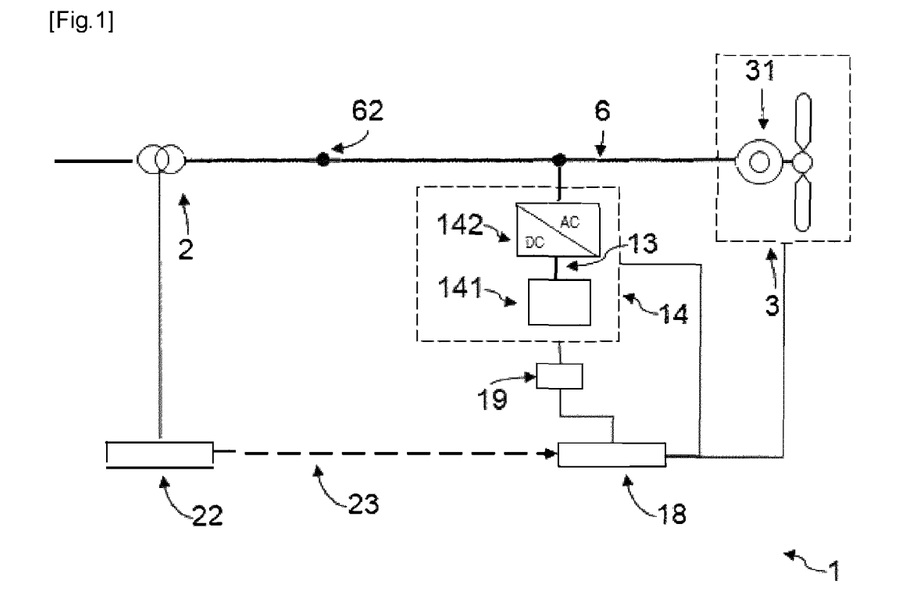
FIG. 1 is a schematic representation of a power generation system according to a first embodiment of the invention.

FIG. 1 is a schematic representation of a power generation system 1 according to a first embodiment of the invention.

The power generation system 1 comprises a water turbine system 3 comprising an electrical machine 31 (typically a synchronous machine), an energy storage system 14, a state of charge determination device 19, a control circuit 18, a connection interface 62 and a feeder link 6. The feeder link 6 connects the electrical machine 31 to the connection interface 62. The energy storage system 14 is connected to the feeder link 6. The control circuit 18 is connected to the state of charge determination device 19, to the energy storage system 14 and to the water turbine system 3. The state of charge determination device 19 is configured to determine the state of charge of the energy storage system 14.

The connection interface 6 is connected to an AC grid 2, typically a three-phase AC grid. In addition, a control circuit 22 is connected to the AC grid 2 and is used to generate an electrical power setpoint Reps based on the power demanded by the AC grid 2. The electrical machine 31 is configured to generate electrical power and transfer it to the AC grid 2 via the connection interface 62.

Figure 5:
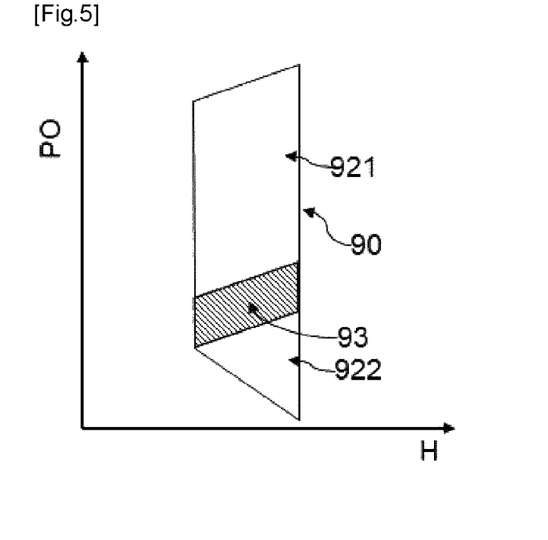
FIG. 5 is a diagram of the range of electrical power setpoints of a water turbine system as a function of water head.

FIG. 5 is a diagram of the range of electrical power setpoints of the water turbine system 3 as a function of its water head H. The electrical power PO of the water turbine system 3 is shown on the ordinate, its water head H is shown on the abscissa. The range of electrical power setpoints includes identified-risk undesirable electrical output power setpoints, illustrated in area 93. The identified-risk undesirable electrical output power setpoints may correspond to S-shaped instability of a Francis turbine or reversible Francis turbine, the occurrence of unstable vortices between turbine blades, helical cables downstream from a turbine or axial cables downstream from a turbine. The blank area 90 shows the range of safe electrical power setpoints. The area 90 comprises a lower safety output power area 922 and an upper safety output power area 921. The area located outside area 90 can be considered an inaccessible area.

The control circuit 18 is configured to receive an electrical power setpoint Reps from the control circuit 22 (e.g. via a communication link 23). The control circuit 18 is configured here to receive the current water head value H from the water turbine system 3. The control circuit 18 subsequently determines whether the electrical power setpoint Reps supplied by the control circuit 22 belongs to the identified-risk undesirable output power setpoints, illustrated by the area 93 in the diagram in FIG. 5. The control circuit 18 may also receive any relevant parameter to determine whether the power setpoint Reps belongs to the area 93.

Depending on the electrical power setpoint Reps and the state of charge of the energy storage system 14, the control circuit 18 generates:

- a setpoint of the actual electrical power Aepos. This setpoint Aepos is chosen to be one of the identified safe electrical output power setpoints, corresponding to area 90 in the diagram in FIG. 5. This setpoint Aepos is subsequently supplied to the turbine system 3;
- an electrical power transfer setpoint Epts. This setpoint Epts is subsequently supplied to the energy storage system 14. This setpoint Epts is set according to the determined state of charge of the energy storage system 14. The setpoint Epts causes the energy storage system 14 to be charged or discharged in order to transfer electrical power with the feeder link 6.

The setpoints Epts and Aepos are determined by the control circuit 18 to fulfil the relationship Reps=Epts+Aepo.

When provided with the respective setpoints Epts and Aepos, the energy storage system 14 and the water turbine system 3 provide the corresponding electrical power over the connection link 6. In this way, the power generation system 1 is able to supply the required power Reps to the AC grid 2, without operating the water turbine system 3 under undesired risky conditions. The different forms of management of the state of charge of the energy storage system 14 are highlighted below.

Figure 6:
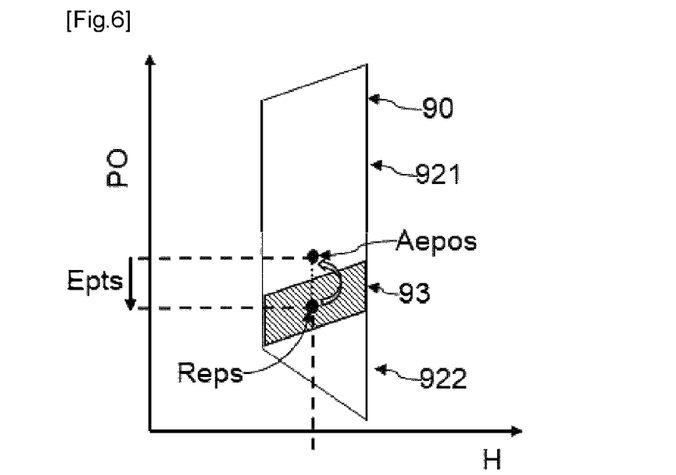
FIG. 6 is a diagram of the electrical output power setpoint range illustrating an example of offsetting the setpoint to avoid operating the water turbine in a risky and undesirable electrical power setpoint range.

FIG. 6 illustrates a first operating mode of the power generation system 1. A setpoint Reps is received by the control circuit 18 and is located in the undesirable risk area 93. In this first mode of operation of the power generation system 1, the energy storage system 14 is determined to be rather discharged, depending on its state of charge. The state of charge is, for example, compared to a threshold level (e.g. 50%) to determine whether the energy storage system 14 is rather discharged or rather charged. Here, the control circuit 18 determines that the energy storage system 14 is discharged. The setpoint Aepos is then set higher than the setpoint Reps in area 921. This setpoint Aepos is sent to the water turbine system 3. The setpoint Epts is set to charge the energy storage system 14, with the water turbine system 3 transferring the charging power to the energy storage system 14. This setpoint Epts is supplied to the energy storage system 14.

Figure 7:
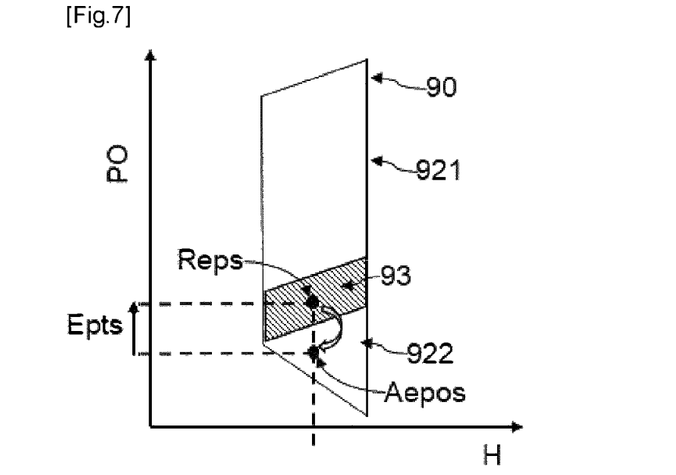
FIG. 7 is a diagram of the electrical output power setpoint range illustrating another example of offsetting the setpoint to avoid operating the water turbine in the risky and undesirable electrical power setpoint range.

FIG. 7 illustrates a first operating mode of the power generation system 1. A setpoint Reps is received by the control circuit 18 and is located in the risk area 93. In this first mode of operation of the power generation system 1, the energy storage system 14 is determined to be rather discharged, depending on its state of charge. The setpoint Aepos is then set lower than the setpoint Reps in area 922. This setpoint Aepos is sent to the water turbine system 3. The setpoint Epts is set to discharge the energy storage system 14, with the energy storage system 14 transferring power to the AC grid 2. This setpoint Epts is supplied to the energy storage system 14.

Figure 8:
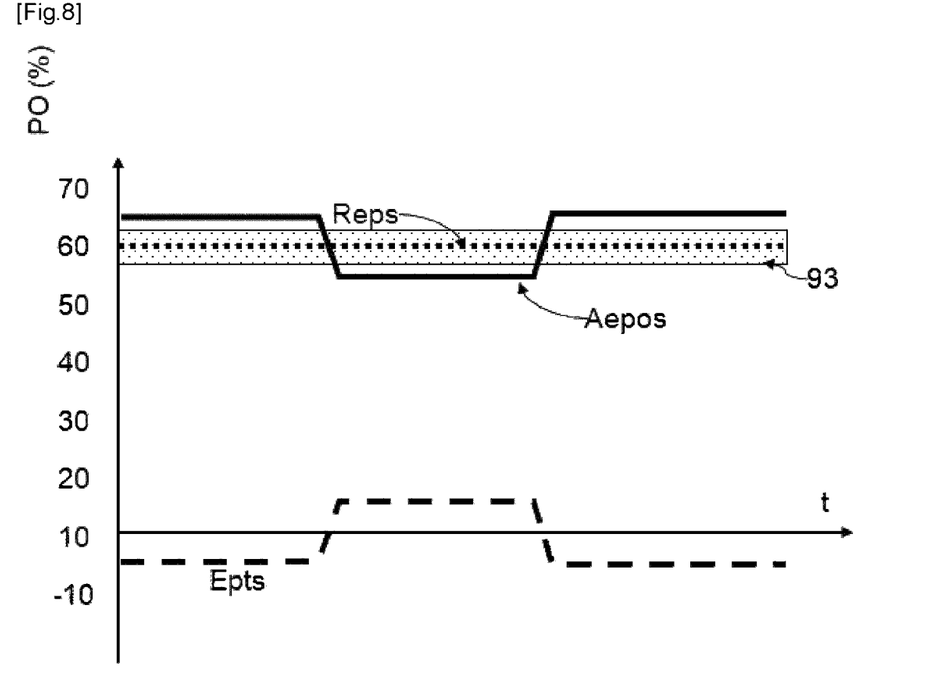
FIG. 8 is a diagram showing the evolution over time of different output power setpoints as a function of the evolution of a state of charge.

The control circuit 18 may alternate between the first and second modes of operation, as illustrated in FIG. 8. The diagram in FIG. 8 illustrates the temporal evolution of the setpoints. In this example, the setpoint Reps (dotted line) received by the control circuit 18 remains at the same level in the undesirable risk area 93. The setpoint Aepos is shown as a solid line. The setpoint Epts is shown as a dotted line. During a first stage, the energy storage system 14 is discharged. As a result, the setpoint Epts is negative and the setpoint Aepos is greater than the setpoint Reps, resulting in charging of the energy storage system 14.

Once a given charge level of the energy storage system 14 is reached, the energy storage system 14 must be discharged. As a result, the setpoints Epts and Aepos are gradually offset. Therefore, the setpoint Epts is set positive and the setpoint Aepos becomes lower than the setpoint Reps.

Once a given discharge level of the energy storage system 14 is reached, the energy storage system 14 must be charged. As a result, the Epts and Aepos setpoints are gradually offset. As a result, the setpoint Epts is set negative and the setpoint Aepos becomes higher than the setpoint Reps.

Figure 9:
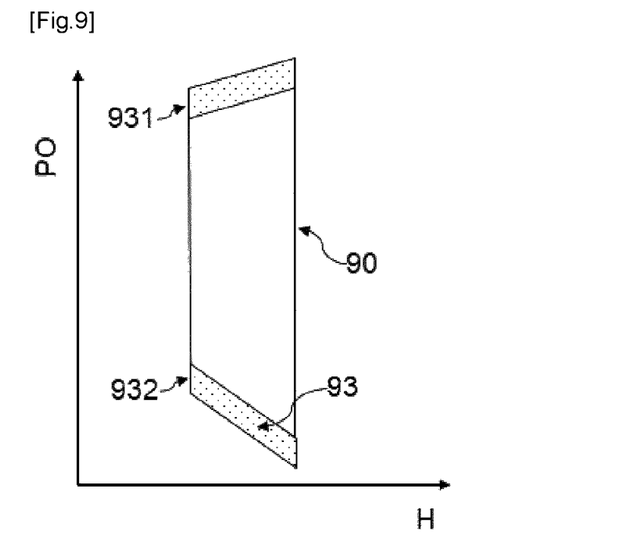
FIG. 9 is a diagram of a modified electrical power setpoint range as a function of water head, with extended upper and lower electrical power setpoint ranges.

FIG. 9 is a diagram of a range of modified electrical power setpoints for a power generation system 1, as a function of the water head of its water turbine system 3. The electrical power setpoint range is provided with extended upper and lower electrical power setpoint ranges. The power setpoint range is extended to the upper area 931 and the lower area 932, which are areas inaccessible or forbidden to the turbine system 3.

Figure 10:
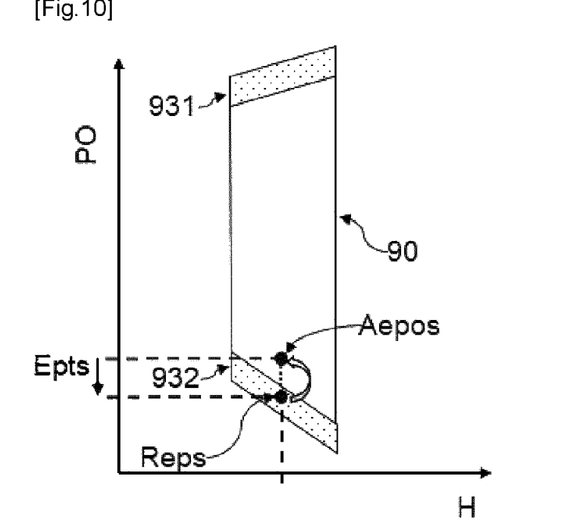
FIG. 10 is a diagram of the modified electrical output power setpoint range as a function of water level, illustrating an example of a power transfer setpoint offset that prevents the water turbine system from operating in the undesirable low risk electrical output power setpoint range.

FIG. 10 illustrates a first operating mode of the power generation system 1. A setpoint Reps is received by the control circuit 18 and is located in the undesirable lower risk area 932. In this first mode of operation of the power generation system 1, the energy storage system 14 is determined to be rather discharged, depending on its state of charge. The setpoint Aepos is then set higher than the setpoint Reps in area 90. This setpoint Aepos is sent to the water turbine system 3. The setpoint Epts is set to charge the energy storage system 14, with the water turbine system 3 transferring the charging power to the energy storage system 14. This setpoint Epts is supplied to the energy storage system 14. Thus, the power generation system 1 can quickly provide less power than the water turbine system 3 alone could provide.

To enable such charging of the energy storage system 14, the control circuit 18 may preventively pre-discharge the energy storage system 14. For example, if the control circuit 18 identifies a setpoint Epts approaching the undesirable low-risk area 932, it may trigger discharging of the energy storage system 14, thereby allowing the energy storage system 14 to undergo subsequent charging. In order to achieve discharging, Epts can be made positive and Aepos can be decreased so that the output power of the power generation system 1 is equal to Reps.

Figure 11:
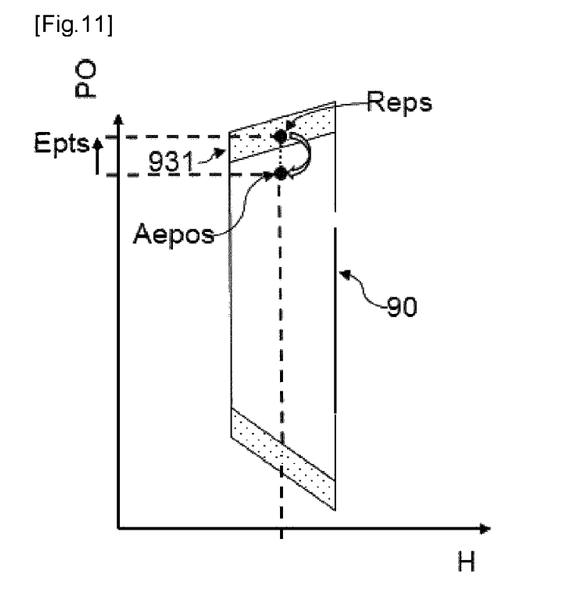
FIG. 11 is a diagram of the range of electrical power setpoints (Reps) as a function of water head, with an extended upper and lower electrical power setpoint range for an electrical power setpoint within the upper electrical power range.

FIG. 11 is a diagram illustrating a fourth mode of operation of the power generation system 1. A setpoint Reps is received by the control circuit 18 and is located in the undesirable upper risk area 931. In this fourth mode of operation of the power generation system 1, the energy storage system 14 is determined to be rather discharged, depending on its state of charge. The setpoint Aepos is then set lower than the setpoint Reps in area 90. This setpoint Aepos is sent to the turbine system 3. The setpoint Epts is set to discharge the energy storage system 14, with the energy storage system 14 transferring power to the AC grid 2. This setpoint Epts is supplied to the energy storage system 14. Thus, the power generation system 1 can quickly provide less power than the water turbine system 3 alone could provide.

To enable such discharge of the energy storage system 14, the control circuit 18 may pre-emptively pre-load the energy storage system 14. For example, if the control circuit 18 identifies a setpoint Epts approaching the undesirable upper risk area 931, it may trigger charging of the energy storage system 14, thereby allowing the energy storage system 14 to undergo subsequent discharging. In order to achieve discharging, Epts can be made positive and Aepos can be decreased so that the output power of the power generation system 1 is equal to Reps.

The state of charge determination device 19 may include sensors for measuring the voltage or current of the energy storage system 14 or computers that simulate the instantaneous state of charge of the energy storage system 14 according to its characteristics. The state of charge determination device 19 is configured to determine the current state of charge of the energy storage system 14 and to transmit it to the control circuit 18. The state of charge determination device 19 can also evaluate the health status of the energy storage system 14 and transmit this to the control circuit 18.

In the same embodiment of the invention, the energy storage system 14 comprises a DC electrical transducer 141 and an AC/DC converter 142. The AC interface of the AC/DC converter 142 is connected to the feeder link 6 and the DC interface of the AC/DC converter 142 is connected to the DC electrical transducer 141 which enables power transfer between the feeder link 62 and the DC transducer 141.

Figure 2:
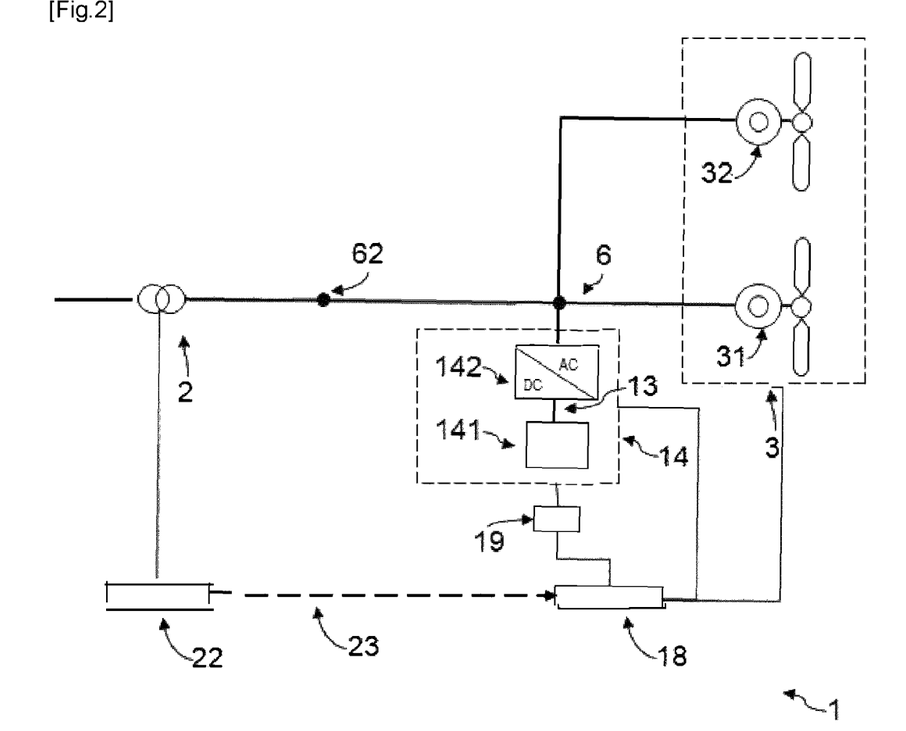
FIG. 2 is a schematic representation of a power generation system according to a first embodiment of the invention.

FIG. 2 is a schematic representation of a power generation system 1 according to a second embodiment of the invention. This second embodiment is identical to the first, except for the structure of the water turbine system 3. In this embodiment, the water turbine system 3 comprises a first reversible pump-turbine 31 and a second reversible pump-turbine 32. Each reversible pump-turbine comprises an electrical machine which is connected to the connection link 6. According to an operating mode of this embodiment, each reversible pump-turbine exchanges electrical power with the AC grid 2. Therefore, the real electrical power setpoint Aepos transmitted by the control circuit 18 fulfils the following relationship: Aepos=Aepos1+Aepos2, where Aepos1 and Aepos2 are the setpoint values of the actual electrical power transmitted to the first turbine 31 and the second turbine 32 respectively. Aepos1 and Aepos2 belong to the safety areas of the respective pump-turbines 31 and 32.

Figure 12:
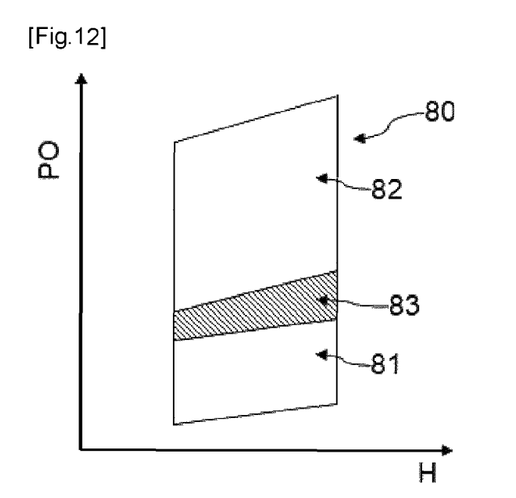
FIG. 12 is a diagram of the range of electrical power setpoints of a water turbine system in FIG. 2 as a function of water head.

FIG. 12 is a diagram of the range of electrical power setpoints of the water turbine system 3 in FIG. 2, based on the water head H of the pump-turbines 31 and 32. The electrical power PO of the turbine system 3 is shown on the ordinate, its water head H is shown on the abscissa. Area 80 shows the range of possible electrical power setpoints for the turbine system 3. Area 80 comprises two areas 81 and 82. The area 81 corresponds to the range of possible electrical power setpoints provided by the pump-turbine 31 or the pump-turbine 32 individually (pump-turbines 31 and 32 are identical in this case). Area 82 corresponds to the range of possible electrical power setpoints that can be achieved with both pump-turbines 31 and 32 operating simultaneously. The range of electrical power setpoints includes electrical output power setpoints that are inaccessible (and therefore undesirable for the turbine system 3), shown in area 83.

In this configuration, the pump-turbines 31 and 32 can operate in turbine mode or pump mode. One can be stopped. The pump-turbines 31 and 32 can be operated in a combination of these possibilities. In another mode of operation of the second embodiment of the invention, the first reversible pump-turbine 31 operates in pump mode to move water over the dam. The pump-turbine 31 operates in a hydraulic short circuit with the second reversible pump-turbine 32. The second pump-turbine 32 operates in generator mode. This configuration, combined with the power transfers between the energy storage system 14 and the feeder link 6, allows the turbine system 3 to extend the electrical power setpoint range of the turbine system 3 and to generate electrical power for higher and lower electrical power setpoints.

Figure 13:
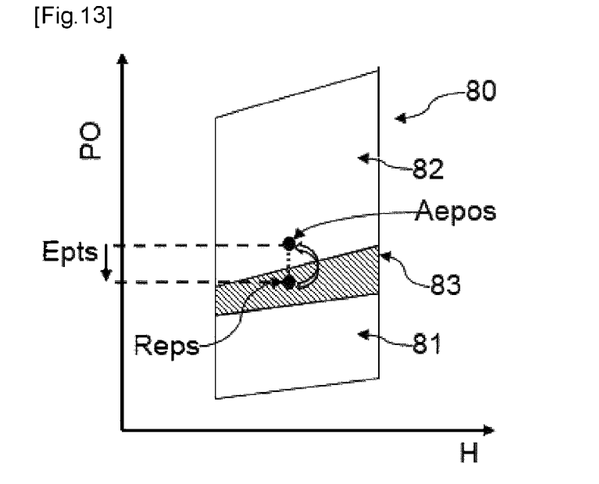
FIG. 13 is a diagram of the electrical output power setpoint range illustrating an example of offsetting the setpoint to avoid operating the water turbine system in FIG. 2 in an unattainable and undesirable electrical power setpoint range.

FIG. 13 shows an operating mode of the power generation system 1 in FIG. 2. A setpoint Reps is received by the control circuit 18 and is located in the unattainable and therefore undesirable area 83. In this first mode of operation of the power generation system 1, the energy storage system 14 is determined to be rather discharged, depending on its state of charge. The state of charge is for example compared to a threshold (e.g. 50%) to determine whether the energy storage system 14 is rather discharged or rather charged. The setpoints Aepos1 and Aepos2 are subsequently adjusted to their minimum values. The sum of Aepos=Aepos1+Aepos2 is greater than the setpoint Reps in area 82. These setpoints Aepos1 and Aepos2 are sent to turbines 31 and 32 respectively. The setpoint Epts is set to charge the energy storage system 14, with the turbine system 3 transferring the charging power to the energy storage system 14. This setpoint Epts is supplied to the energy storage system 14. More precisely, both pump-turbines 31 and 32 operate simultaneously in turbine mode. The setpoint Aepos of the turbine system 3 is in this case the sum of the respective setpoints Aepos1 and Aepos2 of the pump-turbines 31 and 32 respectively.

Figure 14:
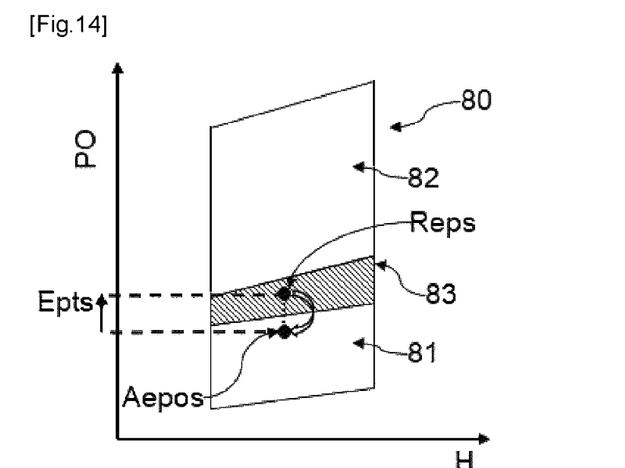
FIG. 14 is a diagram of the electrical output power setpoint range illustrating an example of offsetting the setpoint to avoid operating the water turbine system in FIG. 2 in an unattainable and undesirable electrical power setpoint range.

FIG. 14 illustrates another mode of operation of the power generation system 1 in FIG. 2. A setpoint Reps is received by the control circuit 18 and is located in the unattainable and undesirable area 83. In this second mode of operation of the power generation system 1, the energy storage system 14 is determined to be rather charged, depending on its state of charge. The state of charge is, for example, compared to a threshold (e.g. 50%) to determine whether the energy storage system 14 is rather discharged or rather charged. In this case, the control circuit 18 determines that the energy storage system 14 is charged. The setpoint Aepos1 is set to the maximum value while Aepos2 is set to zero, which means that the turbine 32 is stopped. Aepos=Aepos1+Aepos2 is then lower than the setpoint Reps in area 81. This setpoint Aepos is sent to the water turbine system 3. The turbine system 3 operates only the pump-turbine 31 in area 81 and stops the operation of the pump-turbine 32. Thus, Aepos is defined by the setpoint Aepos1 of the pump-turbine 31 only. The setpoint Aepos2 is zero. The setpoint Epts is set to discharge the energy storage system 14, with the energy storage system 14 transferring power to the AC grid 2. This setpoint Epts is supplied to the energy storage system 14.

Figure 15:
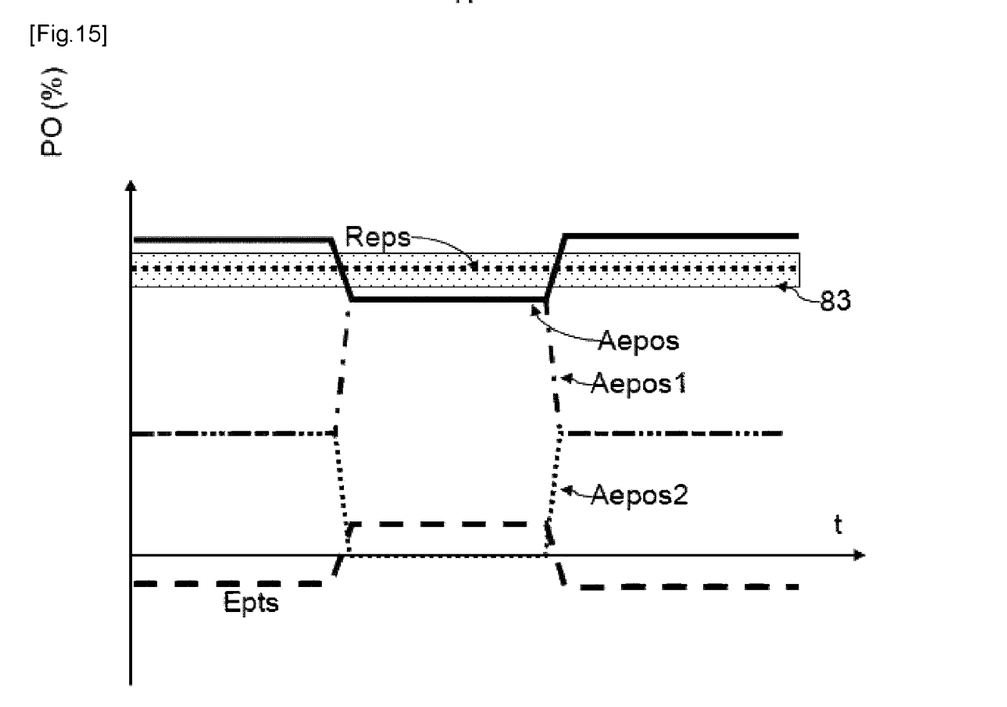
FIG. 15 is a diagram illustrating the evolution over time of different power setpoints as a function of the evolution of a state of charge in the water turbine system in FIG. 2.

For a setpoint Reps remaining in the area 83, the control circuit 18 may alternate between the two modes of operation (illustrated in FIGS. 13 and 14), as shown in FIG. 15. The diagram in FIG. 15 illustrates the temporal evolution of the setpoints. In this example, the setpoint Reps (dotted line) received by the control circuit 18 remains at an identical level in the unattainable and undesirable area 83. The setpoint Aepos is shown as a solid line. The setpoint Epts is shown as a dotted line. The setpoints Aepos1 and Aepos2 are also shown and fulfil the relationship Aepos=Aepos1+Aepos2.

During a first stage, the energy storage system 14 is discharged. As a result, the setpoint Epts is negative and the setpoint Aepos is greater than the setpoint Reps, resulting in charging of the energy storage system 14. Both pump-turbines 31 and 32 are in operation simultaneously in turbine mode.

Once a given charge level of the energy storage system 14 is reached, the energy storage system 14 must be discharged. As a result, the Epts and Aepos setpoints are gradually offset. Therefore, the setpoint Epts is set positive and the setpoint Aepos becomes lower than the setpoint Reps. Gradually, only the pump-turbine 31 remains in service in turbine mode. Therefore, the relationship Aepos=Aepos1 is fulfilled.

Once a given discharge level of the energy storage system 14 is reached, the energy storage system 14 must be charged. As a result, the setpoints Epts and Aepos are gradually offset and the two pump-turbines 31 and 32 are simultaneously in service in turbine mode. As a result, the setpoint Epts is set negative and the setpoint Aepos becomes higher than the setpoint Reps. The relationship Aepos=Aepos1+Aepos2 is then fulfilled. The relationship Reps=Aepos1+Aepos2+Epts is verified for both operating modes.

Figure 3:
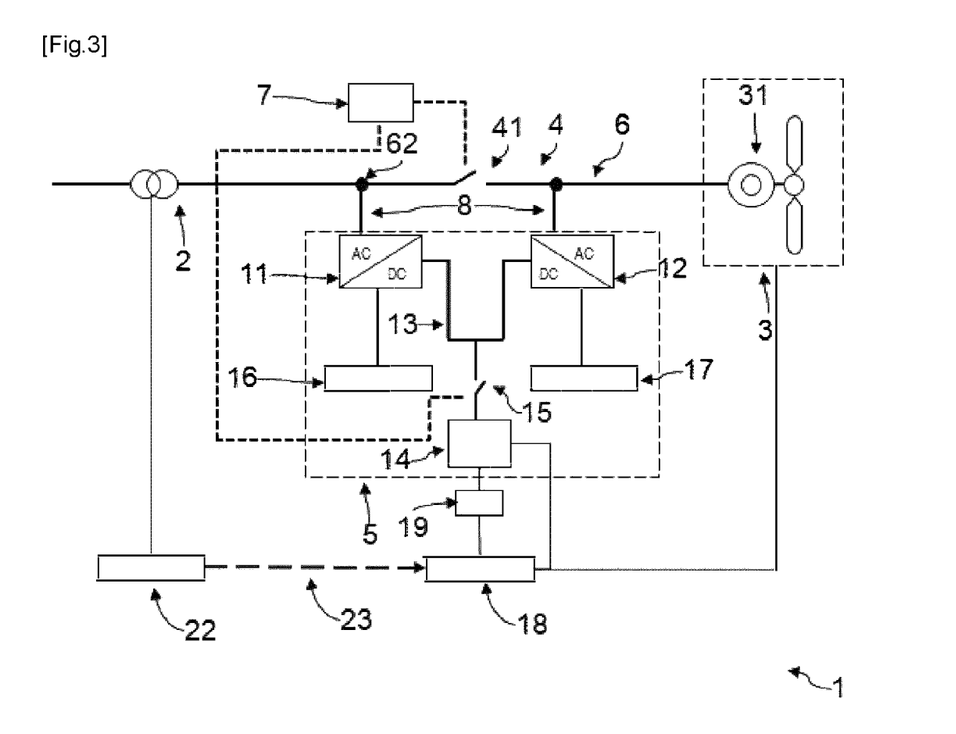
FIG. 3 is a schematic representation of a power generation system according to a third embodiment of the invention.

FIG. 3 is a schematic representation of a power generation system 1 according to a third embodiment of the invention. In this embodiment, the power generation system 1 comprises a branch 4 and a branch 8. The branches 4 and 8 are connected in parallel between the connection interface 62 and the feeder link 6. Branch 4 is defined as the main supply branch and comprises a controlled switch 41. The branch 8 is defined as a secondary supply branch and includes a variable frequency converter 5.

The variable frequency converter 5 comprises an AC/DC converter 11, a further AC/DC converter 12, a DC link 13, a controlled switch 15 and the energy storage system 14.

An AC interface of the AC/DC converter 11 is connected to the connection interface 62 and an AC interface of the AC/DC converter 12 is connected to the feeder link 6. The DC link 13 electrically connects the respective DC interfaces of the AC/DC converters 11 and 12, to enable power transfer between these DC interfaces.

The AC/DC converters 11 and 12 are configured to be current-reversible. The AC/DC converters 11 and 12 are respectively controlled by the control circuits 16 and 17. In one mode of the control circuit 16, power is transferred from the AC interface of the AC/DC converter 11 to the DC interface of the AC/DC converter 11 and in another mode of the control circuit 16, power is transferred from the DC interface of the AC/DC converter 11 to the AC interface of the AC/DC converter 11. In one mode of the control circuit 17, power is transferred from the DC interface of the AC/DC converter 12 to the AC interface of the AC/DC converter 12 and in another mode of the control circuit 17, power is transferred from the AC interface of the AC/DC converter 12 to the DC interface of the AC/DC converter 12.

The power generation system 1 furthermore comprises a control circuit 7. The control circuit 7 is configured to control the switch 41 and the switch 15 of the variable frequency converter 5. The control circuit 7 therefore controls the power transfer between the turbine system 3 and the AC grid 2 via the main branch 4 and the power transfer between the energy storage system 14 and the feeder link 6.

The control circuit 7 has a control mode, in which it simultaneously closes the switch 41 and the switch 15 and thus connects the connection interface 62 and the feeder link 6. In this mode, the control circuit 7 allows power to be transferred from the turbine system 3 to the AC grid 2 via the main branch 4 (or vice versa from the AC grid 2 to the turbine system 3). In addition, the control circuit 18 controls the transfer of power between the energy storage system 14 and the AC grid 2 or turbine system 3 via the branch 8. Indeed, the AC/DC converters 11 and 12 are configured:

to transfer power respectively from their DC interface to their AC interface when discharging of the energy storage system 14 is required; or to transfer power respectively from their AC interface to their DC interface to transfer power from the turbine system 3 or the AC grid 2 to the energy storage system 14 when charging of the energy storage system 14 is required.

Figure 4:
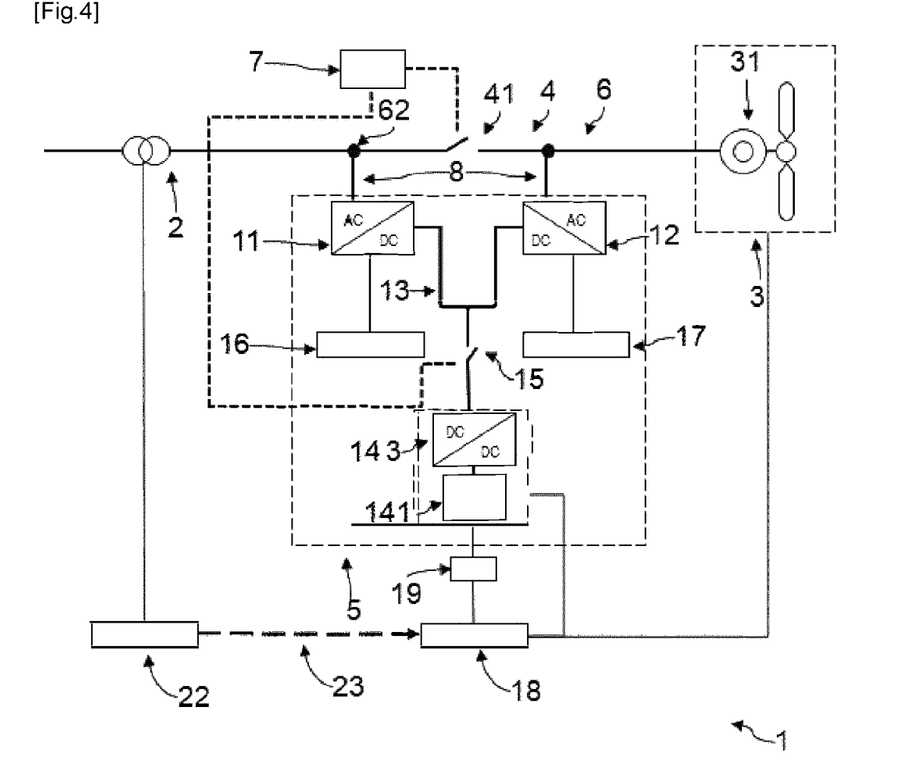
FIG. 4 is a schematic representation of a power generation system according to a fourth embodiment of the invention.

FIG. 4 is a schematic representation of a power generation system 1 according to a fourth embodiment of the invention. This embodiment is identical to the third, except for the structure of its energy storage device 14. In this embodiment, the energy storage system 14 comprises a DC electrical transducer 141 and a DC/DC converter 143. The DC/DC converter 143 electrically connects the energy storage system 14 to the DC interface of the AC/DC converters 11 and 12. The DC/DC converter 143 is configured to adjust the voltage level between the storage device 141 and the DC interfaces of the AC/DC converters 11 and 12.

In the embodiments of the invention, the energy storage system 14 may comprise a storage device selected from the group consisting of a super capacitor, a fuel cell, an electrochemical battery, an electric motor driving a flywheel, an air compressor and an electromagnetic storage.

In the case of an electrochemical battery, the control circuit 18 monitors the charging and discharging of the DC electrical transducer 141 and sets the electrical power transfer setpoint Epts to maintain the state of charge of the DC electrical transducer 141 or within a suitable range of charge to minimise wear and tear and improve battery life. Such a charge range may for example cover 20% of the overall capacity. The limits of this charge range are set according to the characteristics of the battery (e.g. the chemical components used). For example, such a range can be between 40 and 60% for Li-Ion batteries.

The invention claimed is:

1. An electricity generation system, comprising:
a water turbine system comprising an electrical machine, wherein said water turbine system has identified undesirable electrical output power setpoints and safe electrical output power setpoints;
an energy storage device;
a feeder link connected to the energy storage system and the electrical machine of the water turbine system, wherein the feeder link comprises a connection interface for connection to an AC grid;
a state of charge determination device configured to determine the state of charge of the energy storage system; and
a control circuit configured to control electrical power transfer between the feeder link and the energy storage system by selectively controlling charging or discharging of the energy storage system, configured to receive an electrical power setpoint (Reps);
wherein the control circuit is configured to:
determine that this received electrical power setpoint (Reps) belongs to the undesirable electrical output power setpoints, and
generate an electrical power transfer setpoint (Epts) for the energy storage system and an actual electrical output power setpoint (Aepos) for the water turbine system belonging to the safety electrical output power setpoints, fulfilling the relationship Reps=Epts+Aepos, wherein the electrical power transfer setpoint (Epts) is set in dependence on the determined state of charge of the energy storage system.

2. The power generation system according to claim 1, wherein the energy storage system comprises a DC electrical transducer, an AC/DC converter having an AC interface connected to the feeder link and a DC interface connected to the DC electrical transducer.

3. The power generation system according to claim 2, wherein the energy storage system comprises a DC/DC converter configured to change the voltage level between the DC electrical transducer and the DC interface of the AC/DC converter.

4. The power generation system according to claim 2, wherein the DC electrical transducer comprises a device selected from the group consisting of a supercapacitor, a fuel cell, an electrochemical battery, an electric motor driving a flywheel, an air compressor and an electromagnetic storage.

5. The power generation system according to claim 4, wherein the DC electrical transducer is an electrochemical battery having a state of charge range in which its life expectancy is optimised, and wherein the control circuit is configured to set the electrical power transfer setpoint (Epts) such that the state of charge of the electrochemical battery remains within said state of charge range.

6. The power generation system according to claim 1, wherein said undesirable electric output power setpoints and said safe electric output power setpoints are defined for different values of the water head of said water turbine system.

7. An electricity generation system comprising the power generation system of claim 1, wherein the identified unwanted electrical output power setpoints are inaccessible power setpoints of the water turbine system.

8. The electricity generation system according to claim 7, wherein the control circuit causes charging of the energy storage device when the setpoint (Reps) increases above a predetermined threshold level and if the state of charge of the energy storage device is below a predetermined threshold.

9. The electricity generation system according to claim 7, wherein the control circuit causes charging of the energy storage device when the setpoint (Reps) decreases below a predetermined threshold level and if the state of charge of the energy storage device is above a predetermined threshold.

10. The electricity generation system according to claim 7, wherein the water turbine system comprises a plurality of water turbines, each water turbine comprising a respective electrical machine connected to the feeder link.

11. The electricity generation system according to claim 7, wherein the water turbine system comprises a number N of pump-turbines each having an index i operating in hydraulic short circuit and operating with respective actual electrical output power setpoints (Aeposi), wherein the water turbine system is configured to selectively operate at least one of said pump-turbines in turbine mode and to operate at least one other of said pump-turbines in pump mode, with Aepos=>Aeposi for i between 1 and N.

* * * * *